Oct. 15, 1940. A. SCHWARZ Re. 21,600

MULTIPLE QUICK ACTING REFRIGERATING SYSTEM AND PROCESS

Original Filed April 2, 1932 6 Sheets-Sheet 1

Inventor

August Schwarz,

By Erich H. Michaelis

Attorney

MULTIPLE QUICK ACTING REFRIGERATING SYSTEM AND PROCESS

Original Filed April 2, 1932 6 Sheets-Sheet 2

Inventor
August Schwarz,
By Erich H. Michaelis
Attorney

MULTIPLE QUICK ACTING REFRIGERATING SYSTEM AND PROCESS

Original Filed April 2, 1932 6 Sheets-Sheet 3

INVENTOR
AUGUST SCHWARZ

BY
Chindahl, Parker & Carlson
ATTORNEYS.

Oct. 15, 1940. A. SCHWARZ Re. 21,600

MULTIPLE QUICK ACTING REFRIGERATING SYSTEM AND PROCESS

Original Filed April 2, 1932 6 Sheets-Sheet 4

INVENTOR
AUGUST SCHWARZ

BY
Chindall, Parker & Carlson
ATTORNEYS.

MULTIPLE QUICK ACTING REFRIGERATING SYSTEM AND PROCESS

Original Filed April 2, 1932 6 Sheets-Sheet 5

INVENTOR
AUGUST SCHWARZ
BY
Chindahl, Parker & Carlson
ATTORNEYS

MULTIPLE QUICK ACTING REFRIGERATING SYSTEM AND PROCESS

Original Filed April 2, 1932 6 Sheets-Sheet 6

Inventor:
August Schwarz,
By Chindall, Parker & Carlson
Attys.

Reissued Oct. 15, 1940 Re. 21,600

UNITED STATES PATENT OFFICE 21,600

MULTIPLE QUICK ACTING REFRIGERATING SYSTEM AND PROCESS

August Schwarz, Chicago, Ill.

Original No. 1,951,448, dated March 20, 1934, Serial No. 602,862, April 2, 1932. Application for reissue May 25, 1935, Serial No. 23,516

41 Claims. (Cl. 62—115)

The invention relates to multiple quick acting refrigerating systems and processes, and the object of the invention is to provide a refrigerating system consisting of a plurality of condensers, a combination evaporator and condenser, a plurality of compressors, and a double evaporator, all these parts being connected with each other in such a manner that they may selectively be combined to operate as a one or multiple stage refrigerating system.

Another object of the invention is to provide a multiple refrigerating system having a double evaporator consisting of two sets of evaporator tubes which are arranged in relation to each other so that between said tubes a refrigerator pan or the like may be inserted, so that said pan is surrounded on all sides by evaporator tubes, giving the device a high efficiency and quick action.

Another object of the invention is to provide apparatus whereby gas or any other fluid medium of high temperature may be condensed or cooled in a plurality of steps to a very low temperature; and whereby instead of the ordinary two cooling mediums employed, three cooling mediums of different temperature are employed, for example, water is employed in the first stage; obviously a medium colder than water such as brine or a refrigerant of high boiling point is used in the second stage, and in the third or last stage brine of suitable low temperature or a vaporized refrigerant of suitable low boiling point is used as the final cooling medium whereby the refrigerating machine capacity requirements employing the refrigerant of low boiling point will be much lower and in general the refrigerating power consumption by the proposed method will be much lower than by the two stage methods employed heretofore.

Still another object of my invention consists in a novel process whereby compressed carbon dioxide gas or a gaseous refrigerant of low boiling point is cooled by water in the first stage, further cooled in a second stage by vaporization of a refrigerant condensing at atmospheric or much lower condenser pressure than the condenser pressure of the carbon dioxide or of the refrigerant of low boiling point, and whereby a portion of the carbon dioxide or low boiling point refrigerant is vaporized in a third stage to further cool the remaining portion to the desired low temperature.

A further object of my invention consists in a novel process in cooling fluids of high temperature to a low temperature in three stages, by utilizing water as the cooling medium in the first, and by vaporizing a refrigerant of suitable low boiling point at normal suction pressure as the second cooling medium and vaporizing a portion of said refrigerant in the third stage at very low suction pressure or by creating a vacuum to obtain the desired low temperature for the final cooling of the fluid medium.

Other objects of the invention not specifically mentioned may be easily ascertained and understood from the following description in connection with the drawings forming a part thereof.

It is, however, to be understood that the invention is not to be limited or restricted to the exact formation and construction shown in the drawings and described in the specification, but that said invention is only to be limited by the scope of the claims appended hereto.

In the drawings illustrating a preferred embodiment of the invention—

Figure 1:
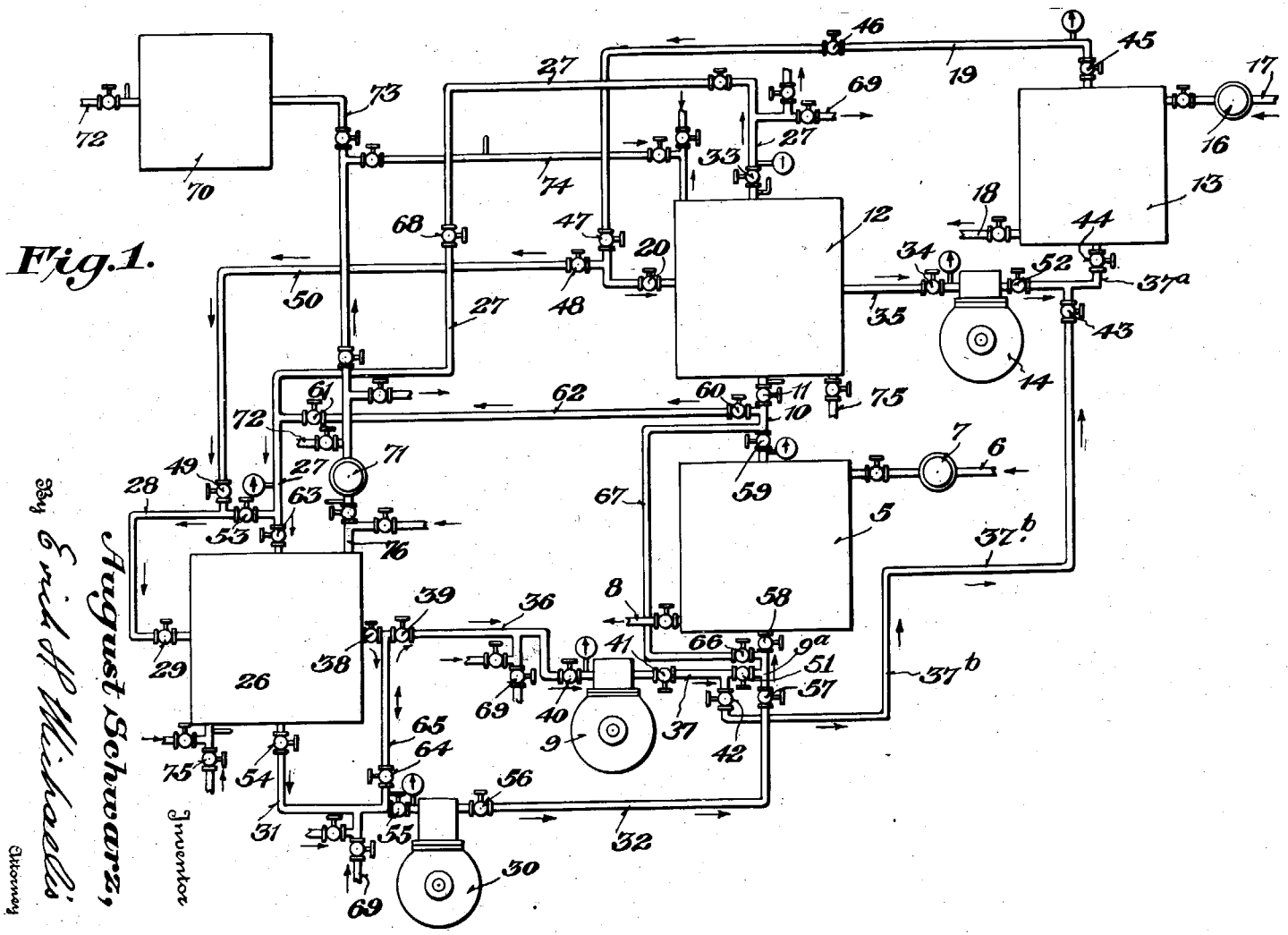
Figure 1 is a diagrammatical plan view of the refrigerating system according to the invention.

The present invention is a modification and improvement over my copending applications Serial No. 429,176 filed February 17, 1930, Serial No. 445,390 filed April 18, 1930, now matured into Patent No. 1,951,447, issued March 20, 1934, and Serial No. 601,262 filed March 25, 1932, now matured into Patent No. 1,954,543, issued April 10, 1934.

In the multiple quick acting refrigerating system according to the present invention, a high pressure condenser or cooler 5 is provided which is cooled by fresh water entering the condenser through a pipe 6 by means of a pump 7, and leaving the condenser through a pipe 8. Any refrigerant may be used in this high pressure condenser, and is compressed by a compressor 9 from which it enters the high pressure condenser 5 through the pipes 37 and 9ª. The liquid refrigerant leaves the high pressure condenser 5 through pipe 10 including a valve 59 and a second pressure reducing valve 11, by which it is introduced into a low pressure and low temperature condenser and liquid cooler 12. The interior of the low pressure and low temperature condenser and cooler 12 constitutes a closed tank or housing 12ª through which extend a plurality of condenser or cooler tubes 21. The refrigerant is discharged by expansion valve 11 into a header 22 from which it enters condenser tubes 21, causing the pressure and temperature of the liquid refrigerant to be considerably reduced because of the low temperature present in condenser 12, as later explained.

If desired, both condensers, the high pressure condenser 5 and the low pressure condenser tubes 21, may be operated at an equal pressure.

When the two units 5 and 12 are operatively connected in series, the unit 5 is a condenser and the unit 12 is a liquid cooler if a relatively high refrigerant pressure is maintained; the unit 5 is a gas cooler and the unit 12 is a condenser if a relatively low refrigerant pressure is maintained; both units may be condensers at different pressures if the expansion valve 11 is partially closed to effect a pressure reduction. The two units 5 and 12 are therefore variously designated as condensers or coolers depending on their use in different operative arrangements.

By "condenser" in the claims is meant condenser or cooler as the case may be depending on operating conditions, for example the pressure of the refrigerant.

Figure 2:
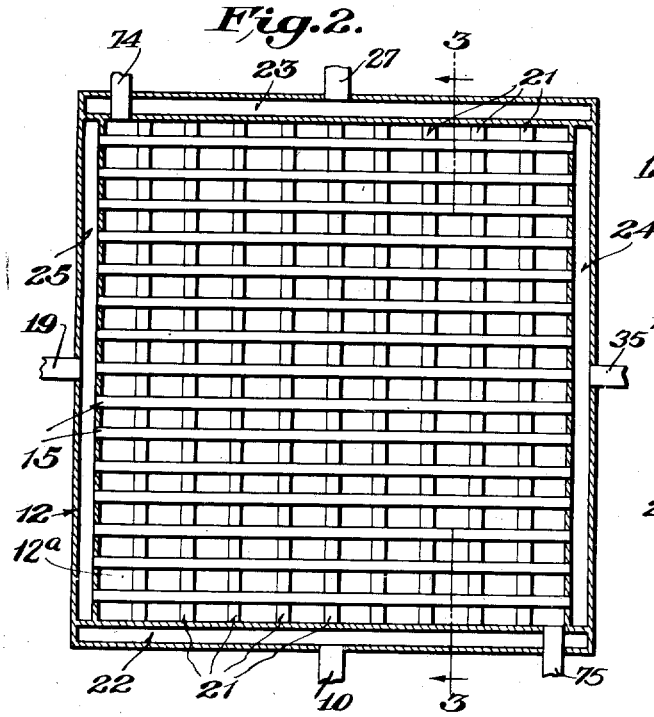
Figure 2 is a combination condenser and evaporator unit used in connection with the present invention.
Figure 3:
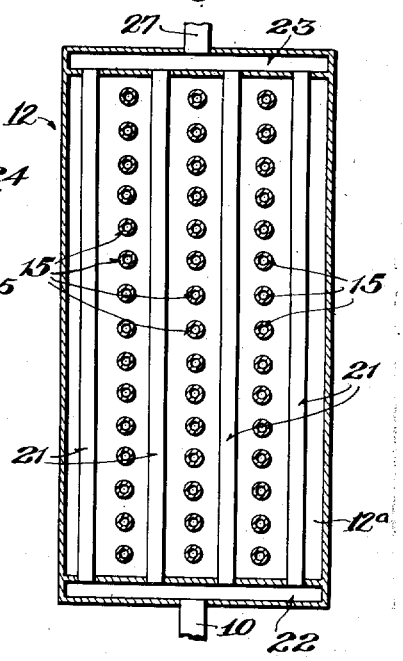
Figure 3 is a sectional view on line 3—3 of Figure 2.

A second fresh water cooled condenser 13 receives a compressed refrigerant through a pipe 37ª, with valves 44 and 52, from a second compressor 14. This refrigerant is drawn through a pipe 35, with a valve 34, off evaporator tubes 15 which are arranged in the combination tank or housing 12ª as illustrated, especially in Figures 2 and 3. The refrigerant is recompressed by the compressor 14, and is cooled in condenser 13 by water supplied by a pump 16 through a pipe 17. This cooling water is drained off by means of a pipe 18. The liquid refrigerant from the second fresh water cooled condenser 13 flows through a pipe 19 and an expansion valve 20 into the evaporator tubes 15 of the combination tank or housing 12ª where the refrigerant cools the refrigerant which is present in the condenser tubes 21; thereby the pressure and temperature is lowered further. Interposed in the pipe 19 are three spaced valves 45, 46 and 47.

The combination unit 12 is provided at its four sides respectively with header manifolds 22, 23, 24 and 25, so arranged that the condenser tubes 21 connect the manifolds 22 and 23 with each other and the evaporator tubes 15 the manifolds 24 and 25.

A double refrigerator or evaporator 26, forming a chamber or housing which may be closed entirely or may be open on top, contains two sets of evaporator tubes 27ª and 28ª, respectively. From the header manifold 23, the liquid refrigerant present in the tubes 21 of the combination unit 12 flows through pipes 27 and 28 and expansion valves 63 and 29 into the evaporator tubes 27ª and 28ª of the double refrigerator or evaporator 26, where said refrigerant evaporates. From these evaporator tubes, the refrigerant vapor is drawn off through a pipe 36 and recompressed by the compressor 9 and then returned through pipes 37 and 9ª into the high pressure condenser 5. The refrigerant vapor in the evaporator tubes 27ª in tank 26 is drawn off through a pipe 31 and recompressed by a compressor 30 and is returned to the high pressure condenser 5 through the pipes 32 and 9ª from where the refrigerant is forced through the pipe 10 into the low pressure and low temperature condenser and cooler tubes 21 of combination unit 12, through pipe 27, and expansion valve 63 back into the evaporator tubes 27ª where it is vaporized again. The two refrigerating circuits described above and using the two sets of evaporator tubes 27ª and 28ª may be used simultaneously. In that case, the refrigerant drawn off by compressor 9 and the refrigerant from the compressor 30 will meet in the pipe 9ª before entering the high pressure condenser 5.

Instead of drawing off and recompressing the refrigerant vapor in the tubes 27ª by compressor 30 and the vapor in the evaporator tubes 28ª by compressor 9 as described above, the contents of both sets of tubes can be drawn off and recompressed by either one of said two compressors. The manner of doing this will be described later on.

If desired, the combination unit 12 may be eliminated by closing expansion valve 11 and a valve 33 arranged in pipe 27 adjacent said unit, the expansion valve 20 in pipe 19, and the valve 34 in pipe 35 through which the compressor 14 draws off the refrigerant vapor from the evaporator tubes 15.

When these valves are closed and the unit 12 is eliminated, the refrigerant vapor in the evaporator tubes 28ª of the evaporator 26 will be drawn off through the pipe 36 by the compressor 9 and will be recompressed by said compressor and forced through pipes 37, 37ᵇ and 37ª into the second fresh water cooled condenser 13, and in this event valves 38, 39, 40 in pipe 36, valves 41, 42, 43, and 44 in pipes 37, 37ᵇ and 37ª, valves 45, 46, and 47 in pipe 19, valves 48 and 49 in pipe 50, and the expansion valve 29 in pipe 28 must be open. The valves 51 and 52 in pipes 37 and 37ª and valves 53 in pipe 28 must be closed, and thereby the circuit between the compressor 9, the condenser 13, and the evaporator 26 is completed.

When, as mentioned above, the combination unit 12 is eliminated, a refrigerant circuit may be established and used between the compressor 30, the high pressure condenser 5, and the evaporator tubes 27ª of the evaporator 26.

To accomplish this, the valves 54 and 55 in the pipe line 31, the valves 56 and 57 in the pipe line 32, valve 58 in pipe 9ª, valve 59 in pipe 10, valves 60 and 61 in pipe 62, and the expansion valve 63 must be open, while the valve 64 in pipe 65 which connects the pipe 31 with the pipe 36, the valve 51 in pipe 37, the valve 66 in the bypath 67 connecting pipes 9ª and 10, the valve 68 in pipe 27, and the valves 53 in pipe 28 must be closed.

When, as stated above, either one of the two compressors 9 or 30 is to be used in connection with the two sets of evaporator tubes 27ª and 28ª of the evaporator 26, it is only necessary to open or close some of the above mentioned valves. If, for instance, the compressor 9 is to be used, the valve 55 in pipe line 31 is closed, while the valves 54, 64, 38, 39, and 40 are open. If, however, the compressor 30 is to be used, the valve 39 is to be closed, and the valves 38, 54, 64 and 55 are to be open.

The bypath 67, connecting the pipe 9a and the pipe 10 may be used, if desired, to eliminate the high pressure condenser 5. To accomplish this, the valves 58, 59, and 60 must be closed, while the valve 66 must be open. By eliminating the high pressure condenser, power is saved, because the resistance in the high pressure condenser is removed. The bypaths, however, should only be utilized after the temperature and the suction pressure in the double evaporator 26 have been lowered.

If desired, the double evaporator 26 may be eliminated, and then the combination condenser and evaporator 12 may be used as a double refrigerator or evaporator in connection with the two water cooled condensers 5 and 13 respectively.

In order to do this, the tubes 21 in the combination unit 12 must be emptied, and this is done in the following manner: The expansion valve 11 and the valves 54, 68, 49, and 42 are closed. One of the bypaths 69 leading from pipe 27 to pipe 31 is then opened, and the liquid refrigerant in the condenser tubes 21 is drawn off and recompressed by means of the compressor 30 and goes through the following pipe line: pipe 27, bypath 69, pipe 31, compressor 30, pipe 32, pipe 9a, high pressure condenser 5, pipe 10, pipe 62, pipes 27 and 28. A part of said refrigerant enters the evaporator tubes 27a through the expansion valve 63, the other portion enters the evaporator tubes 28a through the expansion valve 29. The latter part is drawn off and recompressed by compression 9 and returned to the condenser 5. The first part is cooled and liquefied by the last mentioned part, and collected in the evaporator tubes 27a from where it cannot escape, since the valve 54 is closed. In this manner, the condenser pipes 21 are emptied. After that is done, the valves 48, 60, 66, and 51 are closed.

Figure 5:
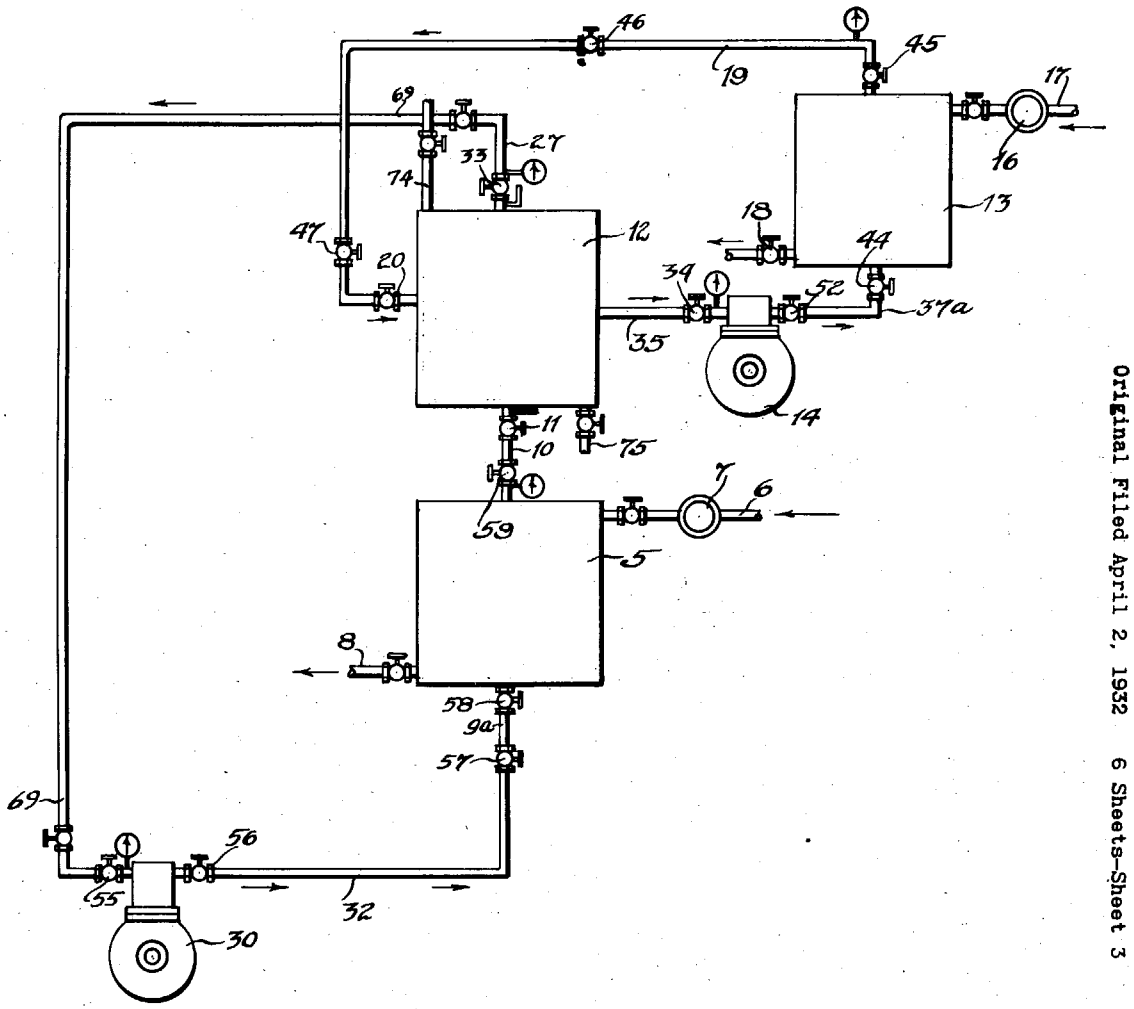
Figure 5 is a diagrammatic view of a portion of the system shown in Figure 1, and illustrating one of the uses of the system.

The evaporator tubes 15 in the combination unit 12, the fresh water cooled condenser 13 and the compressor 14 are connected and operate together as described before, so that any liquid refrigerant entering the emptied tubes 21 from the high pressure condenser 5 evaporates in these tubes. The refrigerant vapor in the tubes 21 is drawn off and recompressed and returned to the condenser 5 by compressor 30 through the bypath 69 and the pipes 32 and 9a. In this manner, both sets of tubes in the unit 12 are being used as evaporator tubes, and said tank is actually acting as a double evaporator as illustrated in Figure 5.

A fluid medium may be conducted either from the double evaporator 26 or from the combination unit 12 through a cooling room 70 by any suitably and conveniently laid out pipe line. For instance, if the unit is used as a combination evaporator and condenser, a brine solution can be forced by means of a brine pump 71 through a pipe 72 into and through the cooling room 70 and from there through pipes 73 and 74, combination unit 12a, pipe 75, the double evaporator 26, and the pipe 76 back to the pump 71. By conducting the brine through this pipe line, the brine coming from the cooling room will be cooled in the combination unit 12 so that the brine solution will return to the double evaporator 26 at a reduced temperature. While the brine solution flows through unit 12, it will be cooled by the vaporized refrigerant in the evaporator tubes 15.

Figure 4:
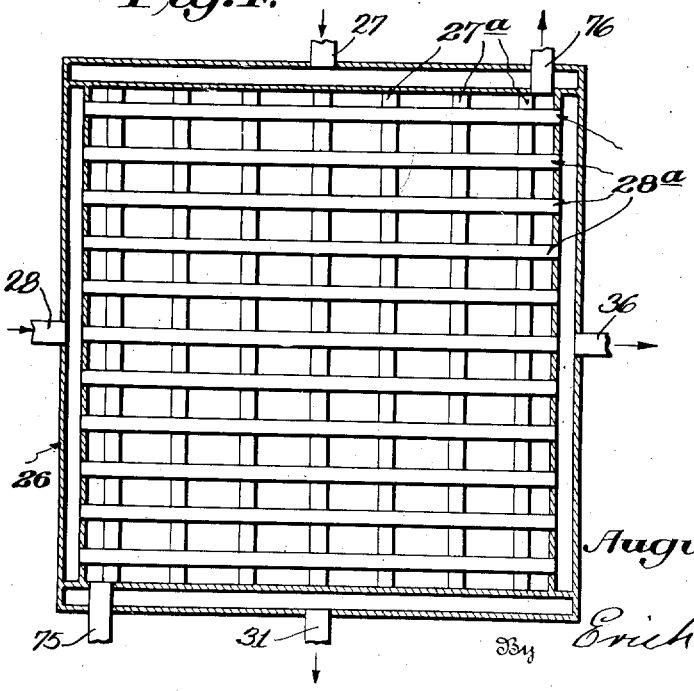
Figure 4 is a view similar to Figure 2, showing a double refrigerator used in connection with the present invention.

The evaporator tubes 27a of the double evaporator 26 which are shown in Figure 4 as extending vertically are preferably arranged at a distance from each other greater than the distance between the horizontal extending evaporator tubes 28a, thereby a rectangular opening is obtained between adjacent and crosswise extending evaporator tubes, and these openings are adapted to receive refrigerator pans which will be surrounded entirely by evaporator tubes so that liquid or any substance in these refrigerator pans may be frozen solidly in a comparatively short time.

Recapitulating, it will be evident that the multiple system is capable of numerous adjustments to satisfy widely varying operating conditions.

Thus, the units 5 and 12 may be utilized in series, or the unit 5 may be eliminated by means of the by-pass line 67.

Similarly, the unit 12 may be eliminated by means of the by-pass line 62. If desired, part of the liquid refrigerant from the condenser 5 may pass through the by-pass line 62 and the remaining portion may be directed through the unit 12 to the line 27.

Regardless of how the units 5 and 12 are connected in the system, either or both of the elements 27a and 28a in the double evaporator may be utilized. For the spent gases from the evaporator 26, either or both of the compressors 9 and 30 may be employed.

The two water cooled condensers 5 and 13 may be connected respectively in single stage systems with either of the units 12 and 26 as the evaporator. The manner in which the condensers 5 and 13 may be incorporated in two single stage systems jointly utilizing the double evaporator 26 will be evident from Figures 1 and 6. One circuit proceeds from the condenser 5 through the lines 10, 62 and 27, the expansion valve 63, the tubes 27a, the line 31, the compressor 30 and the lines 32 and 9a back to the condenser. The other circuit proceeds from the condenser 13 through the lines 19, 50 and 28, the expansion valve 29, the tubes 28a, the line 36, the compressor 9 and the lines 37, 37b and 37a back to the condenser. Utilization of two single stage systems with the condensers 5 and 13 for cooling the unit 12, which in this case constitutes a double evaporator, is specifically illustrated in Figure 5.

Figure 6:
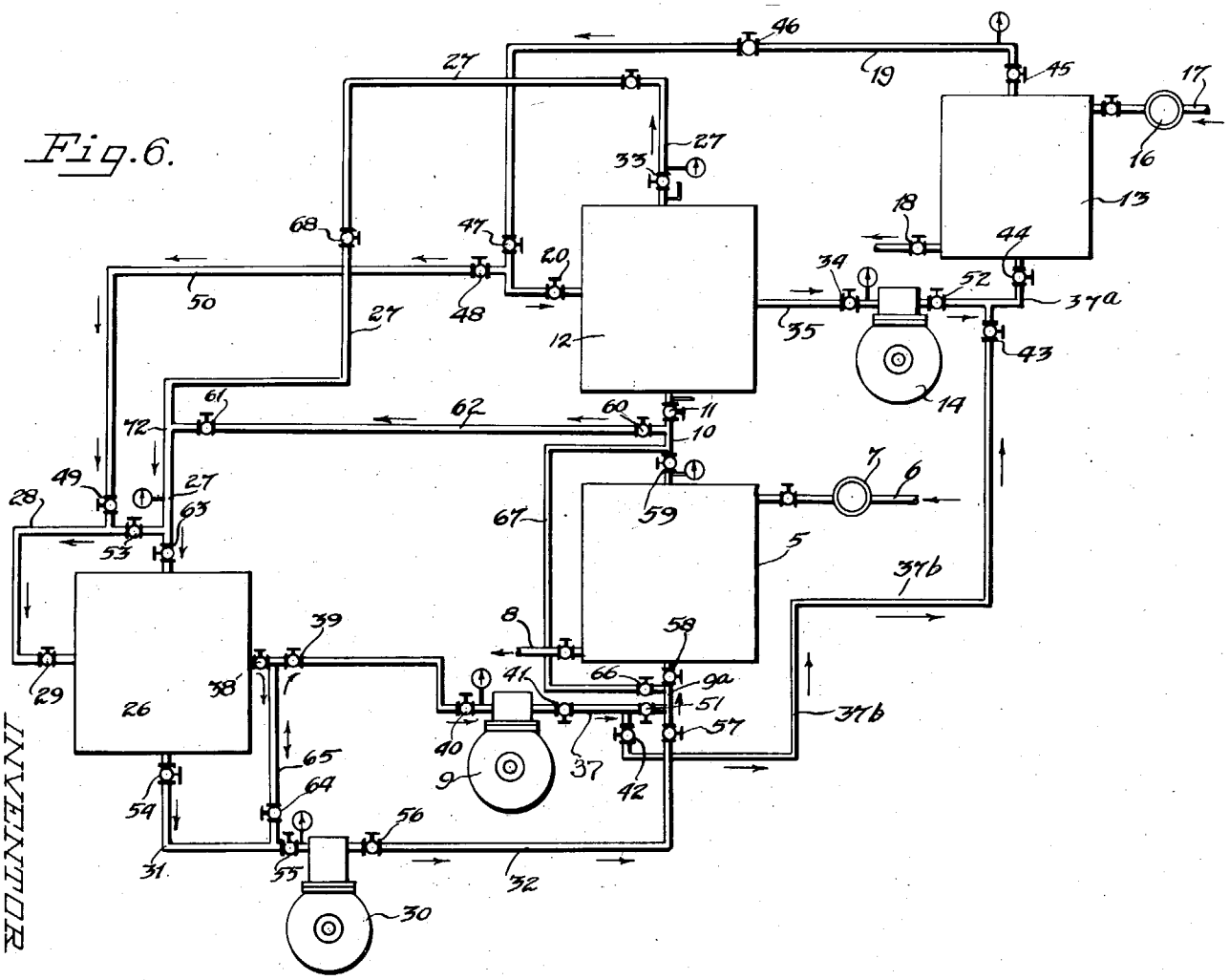
Figure 6 is a fragmentary diagrammatic view illustrating another use of the system.

All of the foregoing arrangements are possible in the plant as illustrated in Figures 1 and 6. Figure 1 shows the plant as adapted for the cooling of brine or other equivalent medium. Figure 6 differs in that it illustrates the plant as adapted for the quick freezing of ice or other commodity in the refrigerator 26.

Figure 7:
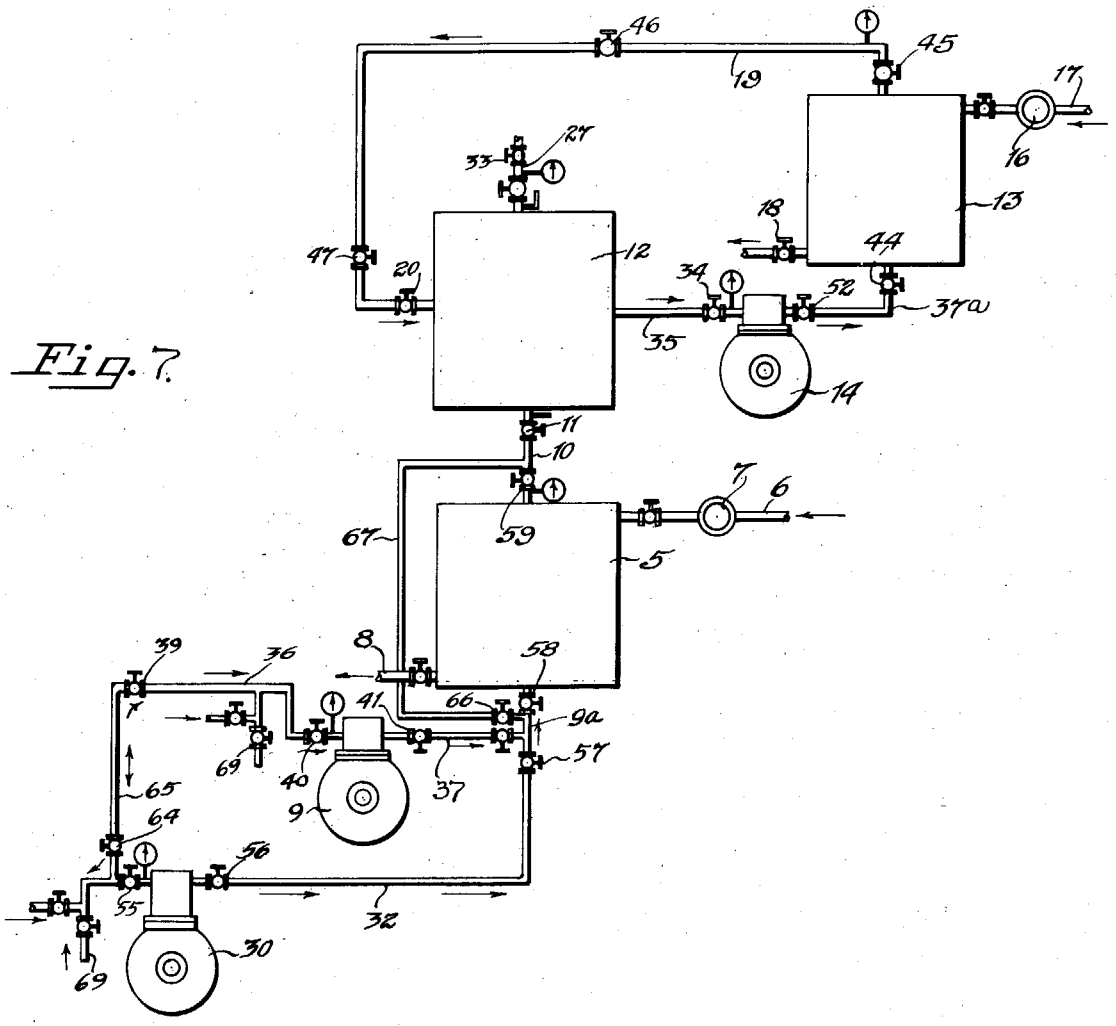
Figure 7 is still another fragmentary diagrammatic view illustrating the use of a portion of the system for condensing and cooling a refrigerant, and also for cooling of a fluid medium.

The system may also be adapted for the cooling of liquid refrigerant for outside use. Such arrangement is illustrated in Figure 7 wherein the refrigerant is compressed in either or both of the compressors 9 and 30, then condensed in 5 and further cooled in 12 or, if directed through the by-pass 67, condensed in the unit 12 which is cooled by expanding refrigerant. The cold liquid refrigerant may be taken off through the line 27 for outside use. Additional refrigerant may be supplied to the system through the line 69.

Figure 8:
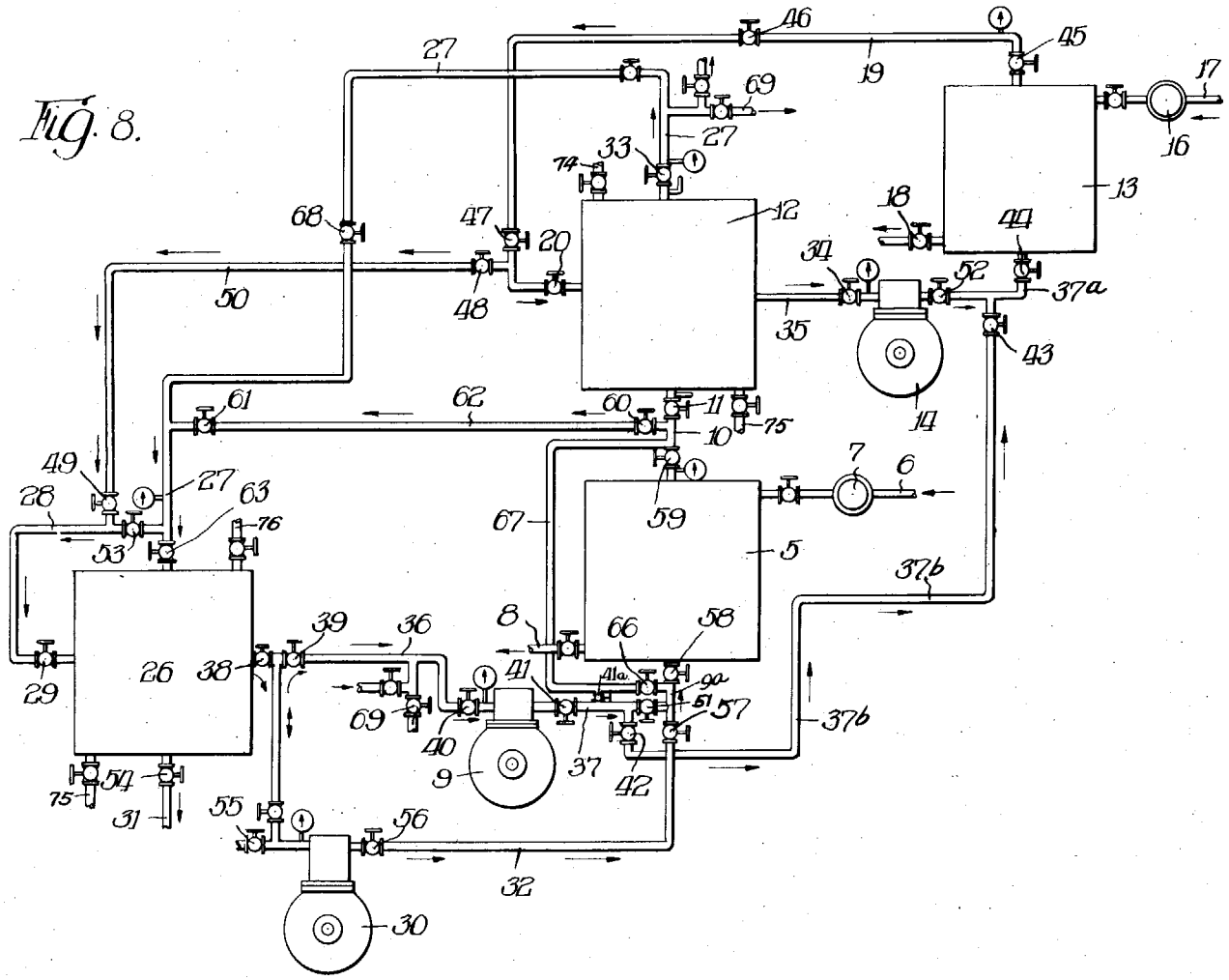
Figure 8 is a fragmentary diagrammatic view of a portion of the system adapted for cooling of refrigerant gases or for cooling of other fluids of high temperature to a low temperature.

Figure 8 illustrates the system as adapted for the cooling of a fluid medium in three stages by utilizing three different cooling mediums of different temperature to cool the fluid to a very low temperature for outside use; or for example a refrigerant may be cooled as a preliminary step in the production of solid $CO_2$ (dry ice). Liquid refrigerant from the condenser 5 and the unit 12 enters the line 27 and then splits, one portion being vaporized in the tubes 28ᵃ, and the other portion passing through the fully opened valve 63 into the tubes 27ᵃ where it is further cooled by the vapor in the tubes 28ᵃ. Where the system is to be employed for the purpose just mentioned, a closed circuit is employed in which preferably ammonia is used as a refrigerant, this circuit involving the unit 12, compressor 14, condenser 13 and expansion valve 20 arranged in series; this cycle being employed for cooling the unit 12 which constitutes the carbon dioxide cooling element. The cooled carbon dioxide of low temperature coming from cooler 12 passes through conduit 27 which communicates with cooling unit 26. Conduit 27 is provided with a branch line 28 which communicates with the evaporator tubes located in the cooling unit 26 and pipe 28 is provided with an expansion valve 29.

A portion of the low temperature carbon dioxide flowing through conduit 27 enters the unit 26 through the open valve 63 while another portion passes through the expansion valve 29. The cooled liquid refrigerant from unit 26 may be taken off for outside use through conduit 31, as disclosed in Figure 8, while the low temperature exhaust in the evaporator tubes may be taken off from unit 26 by compressor 9 and directed by connection 41ᵃ into by-pass 67 from whence it is directed into cooler 12. Additional gases may be taken in on the suction side of compressor 30 and directed by means of conduit 32 into the fresh water condenser 5, thence into cooler 12, or by means of conduit 67 into cooler 12, where the additional gas is made to mingle with the exhaust. Any suitable pressure, either high or low, may be employed. If desired, the refrigerant from the condenser 13 may be split, where the system is to be used for refrigerating purposes only, one part going to the unit 12 through line 19 and the other part passing through the lines 19, 50 and 28, the tubes 28ᵃ in unit 26 and the lines 36, 37 and 37ᵇ and 37ᵃ back to the condenser 13. The cold liquid refrigerant from the tubes 27ᵃ may be withdrawn through the line 31 for outside use. To replace liquid so withdrawn, additional refrigerant may be supplied to the system at the inlet of the compressor 30 and then to the condenser 5. The gaseous refrigerant from the tubes 28ᵃ is recompressed. The refrigerant in the tubes 28ᵃ is drawn off by the compressor 9 and may be directed either to the condenser 5 or to the by-pass line 67 through a connection 41ᵃ between the lines 37 and 67 as shown in Fig. 8. If a liquid is to be introduced for the purpose of chilling, it may be introduced through pipe 32 directly into condenser or cooler 5, through units 12 and 26. If desired, a cooling medium, for example water, may be employed in condenser 5; vaporized ammonia or brine may be utilized in unit 12; and ammonia may be utilized in unit 26. It may be understood if ammonia or similar refrigerant is used in units 12 and 26, a lower suction pressure or vacuum is maintained in unit 26 than in unit 12.

It will be understood that any suitable refrigerants may be employed in the system. Thus, ammonia alone or ammonia and carbon dioxide or similar refrigerants may be employed in different stages of the system, depending on the results to be accomplished, may be used. If the entire system is in operation and employing only one refrigerant and it is desired to produce lower temperature in the combination unit 12, a part of the refrigerant coming from the condenser tubes in unit 12 which passes through pipes 27 and 28, to double evaporator 26, may be led through pipe 50 (which is connected with pipe 28) to the junction with pipe 19 and allowed to mingle with the liquid refrigerant coming from condenser 13, before passing through expansion valve 20. The vaporized refrigerant is drawn from the evaporator tubes in unit 12 by compressor 14 and returned to the fresh water cooled condensers 13. The refrigerant vaporized in double evaporator 26 is returned to the fresh water cooled condensers 5 and 13 by either compressor 9 or 30 or both.

The fresh water cooled condenser 13 may be disconnected from the system and liquid refrigerant from the pipe 28 may be returned to unit 12 in the same manner as heretofore defined.

In this event only the part of the refrigerant returned as just described is vaporized by expansion valve 20 in the evaporator tubes in unit 12 and the exhaust is drawn off by compressor 14 and returned to the fresh water cooled condenser 5 by means of pipe lines 37ᵇ, 37 and 9ᵃ; it being understood that valve 44 and valve 47 under these conditions are closed and valves 34, 43, 42, 47 and 49 must be open.

If desired condenser 13, compressors 30 and 9 may be disconnected, and liquid refrigerant from unit 12 may be expanded by expansion valve 63 into one path of the double evaporator 26, the exhaust then directed by means of pipe line 31 and 65 into the other path of said evaporator unit and valve 38 used to drop the suction pressure, the exhaust being made to flow in counterdirection to its usual flow and returned through open expansion valve 29 into pipe 28, by-pass 50, through expansion valve 20 through a second path in unit 12 to compressor 14 and by means of pipe line 37ᵇ and 9ᵃ and thence into condenser 5 and into cooler 12.

In order to have the refrigerant flow through the circuit just described, it will be understood that valves 53, 55, 39, 41, 57, 47 and 44 must be closed, as must also valves 60 and 61.

I am, of course, aware that many changes in the details of construction of units 12 and 26 and relative arrangements of parts, steps, and arrangements of apparatus may be different from the disclosure as given for purposes of illustration. I do not, therefore, desire to be strictly limited to this disclosure as given for purposes of description but rather to the scope of the appended claims.

Having described my invention and how the same is to be used, I claim as new and desire to secure by Letters Patent:

1. In a multiple quick acting refrigerating system, a compressor, a high pressure condenser, a low pressure and low temperature condenser, a pipe connecting said two condensers, an expansion valve adjacent the entrance of the low pressure and low temperature condenser, a refrigerator or evaporator, a pipe connecting the low pressure condenser with the refrigerator or evaporator, an expansion valve adjacent the entrance of the refrigerator, or evaporator, a pipe connecting the refrigerator or evaporator with the compressor, a pipe connecting the compressor with the high pressure condenser, and a closed refrigerating cycle, including a compressor, a condenser, an expansion valve and a refrigerating element adapted to cool the low temperature and low pressure condenser.

2. In a multiple quick acting refrigerating system, a double evaporator containing two sets of refrigerating tubes, each set of said tubes being the refrigerator tubes of a closed refrigerating cycle, each cycle including a compressor, a condenser element and an expansion valve, said cycles permitting the use of different refrigerants, and means for leading a fluid medium through said double evaporator.

3. In a multiple quick acting refrigerating system, a high pressure condenser, a combination evaporator and condenser unit, a set of low pressure condenser tubes in said combination unit, a pipe connecting the high pressure condenser with the low pressure condenser, an expansion valve adjacent the entrance of the low pressure condenser tubes, a double evaporator, two sets of refrigerating tubes arranged in said evaporator, a pipe connecting the outlet of the pressure condenser tubes of the combination unit with one of the sets of the refrigerating tubes in the double evaporator, and another pipe line branching off said pipe and communicating with the entrance end of the other set of refrigerating tubes of the double evaporator, a compressor for each set of refrigerating tubes to draw off and recompress the refrigerant in the corresponding set of refrigerating tubes and a pipe line connecting each of said compressors with the entrance end of the high pressure condenser.

4. In a multiple quick acting refrigerating system a high pressure condenser, a combination evaporator and low pressure condenser, a pipe connecting the outlet end of the high pressure condenser with the inlet of the low pressure condenser tubes, an expansion valve in said pipe adjacent the inlet of the low pressure condensing tubes, a double evaporator, two sets of refrigerating tubes arranged in said double evaporator, a pipe connecting the outlet of the low pressure condenser tubes in the combination evaporator and condenser tank with the inlet of one of the sets of the refrigerator tubes in the double refrigerator, an expansion valve in this pipe adjacent inlet of said set of refrigerator tubes, a branch pipe leading from said pipe to the inlet of the second set of refrigerating tubes in the double evaporator, an expansion valve in said branch pipe adjacent to inlet of the second set of refrigerator tubes, a compressor, a pipe connecting said compressor with the outlet end of the first set of refrigerating tubes, another pipe connecting the compressor with the inlet of the high pressure condenser, a second compressor adapted to draw off the refrigerant vapor of the second set of refrigerating tubes, a pipe connecting said second compressor with the pipe connecting the first compressor and the inlet of the high pressure condenser, a bypath connecting the inlet pipe of the high pressure condenser with the pipe connecting the high pressure and the low pressure condenser, a shut-off valve in the inlet pipe of the high pressure condenser arranged between the inlet to said condenser and the junction of the bypath with the inlet pipe, and a second shut-off valve in the pipe connecting the two condensers and located between the junction of the bypath with the said connecting pipe and the outlet of the high pressure condenser.

5. In a multiple quick acting refrigerating system a high pressure condenser, a combination unit containing a set of low pressure and low temperature condenser tubes, a pipe connecting the high pressure condenser with the low pressure condenser tubes. an expansion valve in said pipe adjacent the inlet of the low pressure condenser tubes, a double evaporator, two sets of refrigerating elements in said evaporator, a pipe connecting the outlet of the low pressure and low temperature condenser tubes with the inlet of one of the sets of the refrigerating elements, an expansion valve in said pipe line adjacent the inlet of the first set of refrigerating elements, a pipe branching off from the pipe which connects the outlet of the low pressure condenser with the inlet of the first set of refrigerating elements, said branch leading into the inlet of the second set of refrigerating elements, a compressor adapted to draw off and recompress the refrigerant vapor from the first set of refrigerating elements, a pipe connecting said compressor with the outlet of the first set of refrigerating elements, another pipe connecting said compressor with the inlet of the high pressure condenser, a second compressor, a pipe connecting the outlet of the second set of refrigerating elements with said compressor, another pipe connecting the second compressor with the pipe leading into the inlet of the high pressure condenser, a pipe connecting the two pipes leading from the outlets of the two sets of refrigerating elements and arranged before the two compressors, and a shut-off valve in each of said pipes behind the junction with the connecting pipe.

6. In a multiple quick acting refrigerating system a high pressure condenser, a set of low pressure condenser tubes, a combination evaporator and condenser unit containing said condenser tubes, a pipe connecting the outlet of the high pressure condenser and the inlet of the low pressure condenser, an expansion valve in said pipe adjacent the low pressure condenser, a fresh water cooled condenser, a set of refrigerating tubes arranged in the combination evaporator and condenser unit, a compressor adapted to draw off refrigerant vapor from the refrigerating tubes, recompress the same and force it into the fresh water cooled condenser, a pipe line connecting the outlet of said condenser with the inlet of the refrigerating tubes, an expansion valve in said pipe line adjacent the said inlet, a double evaporator, two sets of refrigerating tubes arranged in said evaporator, a pipe line connecting the low pressure and low temperature condenser tubes with the inlet of the first set of refrigerating tubes in the double evaporator, an expansion valve in said pipe line adjacent the inlet of said refrigerating tubes, a branch pipe leading from said pipe line to the inlet of the second set of refrigerating tubes in the double evaporator, an expansion valve in said branch pipe, a second compressor adapted to draw refrigerant vapor off the first set of refrigerating tubes in the double evaporator, a third compressor adapted to draw refrigerant vapor from the second refrigerating tubes in the double evaporator, a pipe connecting the second compressor with the corresponding refrigerating tubes, another pipe line leading from the compressor to the high pressure condenser, a further pipe connecting the third compressor with the corresponding refrigerating tubes, a pipe connecting the third compressor with the pipe leading from the second compressor to the high pressure condenser, a cooling room, pipe lines leading from the double evaporator to the cooling room, the combination evaporator and condenser unit and back to the double evaporator, and a pump adapted to circulate a fluid medium through said cooling room, said evaporator and condenser unit and said double evaporator.

7. In a multiple quick acting refrigerating system a high pressure water cooled condenser, a double evaporator, two sets of refrigerating tubes in said evaporator, a pipe connecting the inlet of the first set of said tubes with the outlet of the condenser, a compressor, a pipe connecting the outlet of said tubes with said compressor, another pipe connecting the compressor with the inlet of the condenser, a second fresh water cooled condenser, a pipe line connecting the outlet of this condenser with the inlet of the second set of refrigerating tubes, a second compressor, a pipe connecting said compressor with the outlet of the second set of refrigerating tubes, and another pipe line leading from the second compressor to the second fresh water cooled condenser.

8. In a multiple quick acting refrigerating system a fresh water cooled condenser, a combination condenser and evaporator unit, a set of refrigerating tubes in said unit, a pipe line connecting the outlet of the fresh water cooled condenser with the inlet of the refrigerating tubes, a compressor, a pipe connecting the outlet of the refrigerating tubes with the compressor, another pipe leading from the compressor to the inlet of the fresh water cooled condenser, a high pressure fresh water cooled condenser, a set of low pressure condenser tubes in the combination condenser and evaporator unit, a pipe connecting the high pressure and the low pressure condenser, an expansion valve in said pipe adjacent the inlet of the low pressure condenser tubes, a double evaporator, two sets of refrigerating tubes in said evaporator, a pipe connecting the outlet of the low pressure condenser with the inlet of the first set of refrigerating tubes in the double evaporator, a branch pipe connecting this pipe with the inlet of the second set of the refrigerating tubes in the double evaporator, an expansion valve in said pipe adjacent the inlet of the said first set of refrigerating tubes, a second expansion valve in the branch pipe adjacent the inlet of the second set of refrigerating tubes, a second compressor, a pipe connecting the outlet of the first set of refrigerating tubes in the double evaporator with the second compressor, another pipe leading from the second compressor to the inlet of the high pressure condenser, a third compressor, a pipe connecting said third compressor with the outlet of the second set of refrigerating tubes in the double evaporator, another pipe leading from the third compressor to the inlet of the high pressure condenser, a valve interrupting the communication between the high pressure condenser and the low pressure condenser, a valve interrupting the connection between the first compressor and the outlet of the refrigerating tubes in the combination unit, a valve preventing refrigerant from flowing out of the low pressure condenser tubes, the expansion valve adjacent the inlet of the refrigerating tubes in the combination unit being adapted to be closed, thereby making it possible to eliminate all the tubes in the combination unit, a pipe connecting the expansion valve adjacent the inlet of the first set of tubes in the double evaporator with the outlet of the high pressure condenser, and another pipe line connecting the outlet of the first fresh water cooled condenser with the expansion valve adjacent the second set of refrigerating tubes in the double evaporator.

9. In a multiple quick acting refrigerating system a fresh water cooled condenser, a set of refrigerating tubes arranged in a combination evaporator and condenser unit, a compressor, a pipe connecting the outlet of said refrigerating tubes with the compressor and a pipe leading from said compressor to the inlet of the water cooled condenser, a double evaporator, two sets of refrigerating tubes in said double evaporator, a high pressure condenser, a set of low pressure condenser tubes in the combination unit, a pipe connecting the high pressure condenser with the low pressure condenser, an expansion valve in said pipe adjacent the inlet of the low pressure condenser, a pipe connecting the outlet of the low pressure condenser with the inlet of the first set of refrigerating tubes in the double evaporator, a branch pipe connecting this pipe with the inlet of the second set of refrigerating tubes in the double evaporator, a second compressor, a pipe connecting said compressor with the outlet of the first set of refrigerating tubes in the double evaporator, another pipe leading from this compressor to the inlet of the high pressure condenser, a third compressor, a pipe connecting this compressor with the second set of refrigerating tubes in the double evaporator, a further pipe connecting the last named compressor with the inlet of the high pressure condenser, a valve adapted to interrupt the communication between the second compressor and the outlet of the first set of refrigerating tubes in the double evaporator, another valve adapted to prevent communication between the third compressor and the second set of refrigerating tubes in the double evaporator, the two expansion valves adjacent the refrigerating tubes in the double evaporator being adapted to be closed so that the tubes in said double evaporator are adapted to be eliminated, a pipe adapted to be connected with the low pressure condenser pipes in the combination unit, and with one of the compressors adapted to be connected with one of the sets of refrigerating tubes in the double evaporator.

10. A refrigerating system comprising, in combination, a closed circuit including a compressor, a condenser, an expansion valve, and a refrigerator connected in series in the order named, a second closed circuit including a compressor, a condenser, an expansion valve, and a refrigerator connected in series in the order named, and means defining a refrigerator chamber, each refrigerator comprising inlet and discharge manifolds and a plurality of tubes connecting said manifolds, the tubes of said respective refrigerators being located in said chamber and extending crosswise of each other in intermingled relation.

11. A refrigerating system comprising, in combination, a closed circuit including a condenser, said circuit having a primary path and a secondary path and selectively available, said primary path including an expansion valve, a primary refrigerating element and a compressor in series, said secondary path including an expansion valve, a secondary refrigerating element and a compressor in series, and a second closed circuit including said first mentioned condenser and a second condenser, said second circuit having a second primary path and a second secondary path selectively available, said second primary path including an expansion valve, a second primary refrigerating element connected with said compressors, said second secondary path including an expansion valve, a second secondary refrigerating element and a compressor in series, said primary refrigerating elements being incorporated in a refrigerating unit, said secondary refrigerating elements being incorporated in another refrigerating unit, whereby both units may be combinedly operated or whereby either of said units with two cooling circuits is selectively available.

12. A refrigerating system comprising, in combination, a condenser, a conduit for liquid refrigerant operatively connected to the discharge of said condensers, an evaporator unit having two independent refrigerating elements, said conduit having two discharge branches connected respectively to the inlets of said elements, two expansion valves one interposed in each of said branches, a conduit for refrigerant vapor connected to the inlet of said condenser, said last mentioned conduit having two inlet branches connected respectively to the discharge ends of said elements, two compressors interposed respectively in said inlet branches, two stop valves interposed respectively in said inlet branches at the inlet sides of said compressors, and a by-pass conduit including a stop valve for connecting said inlet branches at the inlet sides of said first mentioned valves, whereby either or both of said compressors may be connected in the circuit.

13. A refrigerating system comprising, in combination, a condenser, a condenser and liquid cooler unit, a conduit connecting said condenser and said unit, a closed circuit including a refrigerating element, a compressor, a condenser and an expansion valve connected in series in the order named, said refrigerating element being arranged in heat exchange relation to said unit, a liquid discharge conduit opening from said unit, an evaporator unit having two separate refrigerating elements, said discharge conduit having two branches connected respectively to the inlets of said elements, two expansion valves one interposed in each of said branches, a conduit for vapor refrigerant for connecting the discharge ends of said elements to the inlet of said first mentioned condenser, compressor means in said last mentioned conduit, and means whereby the compressed refrigerant may be directly conveyed to the condenser and liquid cooler unit.

14. A refrigerating system comprising, in combination, a condenser, a condenser and liquid cooler unit, a conduit connecting said condenser and said unit, a closed circuit including a refrigerating element, a compressor, a condenser and an expansion valve connected in series in the order named, said refrigerating element being arranged in heat exchange relation to said unit, a liquid discharge conduit opening from said unit, an evaporator unit having two separate refrigerating elements, said discharge conduit having two branches connected respectively to the inlets of said elements, two expansion valves one interposed in each of said branches, a conduit for vapor refrigerant connected to the inlet of said first mentioned condenser, said last mentioned conduit having inlet branches connected respectively to said elements, two compressors interposed respectively in said inlet branches, and a by-pass conduit including a stop valve for connecting said first mentioned conduit to said discharge conduit.

15. A refrigerating system comprising, in combination, a condenser, a condenser and liquid cooler unit, a conduit connecting said condenser and said unit, a closed circuit including a refrigerating element, a compressor, a condenser and an expansion valve connected in series in the order named, said refrigerating element being arranged in heat exchange relation to said unit, a liquid discharge conduit opening from said unit, an evaporator unit having two separate refrigerating elements, said discharge conduit having two branches connected respectively to the inlets of said last mentioned elements, two expansion valves one interposed in each of said branches, a conduit for vapor refrigerant connected to the inlet of said first mentioned condenser, said last mentioned conduit having inlet branches connected respectively to said last mentioned elements, two compressors interposed respectively in said inlet branches, and a by-pass conduit including a stop valve for connecting said last mentioned conduit to said first mentioned conduit.

16. A refrigerating system comprising, in combination, a primary condenser, a condenser and liquid cooler unit, a conduit connecting said condenser and said unit, two valves in said conduit, a closed circuit including a compressor, a condenser, an expansion valve and a refrigerating element, said refrigerating element being arranged in heat exchange relation to said unit, an evaporator unit having a refrigerating element, a discharge conduit connecting said last mentioned element to said first mentioned unit, an expansion valve in said discharge conduit, a conduit connecting the outlet of said last mentioned element to said primary condenser, a compressor interposed in said last mentioned conduit, a stop valve interposed in said last mentioned conduit between said primary condenser and said compressor, a by-pass conduit, including a stop valve, connecting said first mentioned conduit at a point between said first mentioned valves to said discharge conduit, and a by-pass conduit including a stop valve connecting said last mentioned conduit at a point between said compressor and said second mentioned stop valve to said first mentioned conduit at a point between said first mentioned valves.

17. A refrigerating system comprising, in combination, a water cooled condenser, a condenser and liquid cooler unit, a conduit connecting said condenser and said unit, a closed circuit including a refrigerating element, a compressor, a condenser and an expansion valve connected in series in the order named, said refrigerating element being arranged in heat exchange relation to said unit, a liquid discharge conduit opening from said unit, an evaporator connected to said discharge conduit, an expansion valve in said discharge conduit, a conduit for refrigerant vapor connecting said evaporator to said first mentioned condenser, a compressor in said last mentioned conduit, and means whereby a fluid medium may be circulated through said unit.

18. A refrigerating system comprising, in combination, a water cooled condenser, a liquid cooler, a refrigerating circuit for cooling said cooler, a conduit connecting said condenser and said cooler, an evaporator, a cooling room, means for circulating a cooling medium from said cooling room through said cooler and said evaporator back to said room, a conduit for liquid refrigerant connecting the outlet of said cooler to said evaporator, an expansion valve in said last mentioned conduit, a conduit for vapor refrigerant connecting said refrigerator to the inlet of said condenser, a compressor in said last mentioned conduit, a by-pass conduit for connecting said first mentioned conduit to said second mentioned conduit at the inlet side of said expansion valve, and a stop valve in said by-pass conduit.

19. A refrigerating system comprising, in combination, a condenser, a conduit for vapor refrigerant connected to the inlet of said condenser, a compressor in said conduit, a liquid cooler unit, a conduit connecting said condenser and said unit, said unit including a cooling element connected to said last mentioned conduit, a passage for a liquid medium to be cooled and a refrigerating element in heat exchange relation to said cooling element and the liquid medium, and a closed circuit including said refrigerating element, a compressor, a condenser, and an expansion valve connected in series, whereby cold liquid medium from said passage and liquid refrigerant from said cooling element are available for outside use.

20. A refrigerating system comprising, in combination, a water cooled condenser, a conduit for vapor refrigerant connected to the inlet of said condenser, a compressor in said conduit, a stop valve in said conduit between said condenser and said compressor, a condenser and liquid cooler unit, a conduit connecting said condenser and said unit, a stop valve in said last mentioned conduit, a by-pass conduit for connecting said first mentioned conduit at a point between said compressor and said first mentioned stop valve to said last mentioned conduit at a point between said last mentioned stop valve and said unit, a stop valve in said by-pass conduit, said unit comprising a cooling element connected to said second mentioned conduit, and a refrigerating element in heat exchange relation with said cooling element, and a closed circuit including said refrigerating element, a compressor, a condenser, and an expansion valve connected in series.

21. A refrigerating system comprising, in combination, a water cooled condenser, a liquid cooler, a conduit connecting said condenser and said cooler, a cooling circuit including a refrigerating element, a compressor, a condenser, and an expansion valve connected in closed series, said refrigerating element being arranged in heat exchange relation to said cooler, a second cooler having a cooling element and a refrigerating element in heat exchange relation, a conduit for liquid refrigerant connected to the outlet of said first mentioned cooler, said last mentioned conduit having two discharge branches connected respectively to the inlets of said elements, an expansion valve interposed at the inlet of said last mentioned refrigerating element, an exhaust conduit connecting the outlet of said last mentioned refrigerating element to the inlet of said first mentioned condenser, and a compressor in said last mentioned conduit, said exhaust conduit having an inlet branch at the inlet side of said compressor for the supply of refrigerant, whereby a portion of the liquid refrigerant from said first mentioned cooler is utilized to further cool another portion of said liquid refrigerant available for outside use from said cooling element.

22. The process of refrigeration which comprises compressing a refrigerant vapor of low boiling point, condensing the compressed refrigerant by the use of water as the cooling medium, further cooling the liquid refrigerant by the use of a cold vaporized refrigerant of higher boiling point as a second cooling medium, vaporizing a portion of the low boiling point liquid refrigerant, and utilizing said vaporized portion as a third cooling medium to further cool the remaining portion of the liquid refrigerant.

23. The process of refrigeration which comprises circulating a refrigerant through a closed path and in the course of circulation successively compressing, condensing and vaporizing said refrigerant, compressing a second refrigerant, utilizing the vaporized refrigerant to condense said second refrigerant, vaporizing a portion of said second refrigerant, and utilizing the vaporized portion of said second refrigerant to further cool another portion of said second refrigerant.

24. In a refrigerating system, a housing defining a chamber, two refrigerating elements located in said housing, a compressor, a condenser, and an expansion valve connected with each of said elements to form two closed refrigerating circuits and each circuit permitting the use of a different refrigerant, said two circuits being operable singly or jointly.

25. In a condensing and cooling system of the character described for low temperature work comprising, in combination, a condenser, a conduit for a fluid medium connected to said condenser, a cooler, a conduit connecting said first condenser and said cooler, a secondary cooler, a conduit for connecting said coolers, a discharge conduit for the cooled medium connected to said secondary cooler, a second water cooled condenser, a discharge conduit connecting said second water cooled condenser with said first mentioned cooler, an expansion valve in said last mentioned discharge conduit, a by-pass conduit connecting said last mentioned discharge conduit and said secondary cooler, an expansion valve in said by-pass, a conduit for vapor refrigerant connecting said first mentioned cooler with said second mentioned condenser, and a compressor inserted in said conduit, a second conduit for refrigerant vapor connecting said secondary cooler and said second mentioned condenser, a compressor inserted in said conduit, and means for conducting a medium to be condensed or cooled through said first mentioned condenser, said first mentioned cooler, and said secondary cooler whereby said cooled medium may be discharged.

26. In a condensing and cooling system of the character described for low temperature work comprising, in combination, a condenser, a fluid medium conveying conduit connected to said condenser, a cooler involving a housing provided with independent controllable passages for the refrigerant medium and mediums to be cooled, a conduit connecting the condenser and said cooler, a secondary cooler involving a housing provided with independent controllable passages, a discharge conduit for the last mentioned cooler, a conduit for connecting one of the fluid medium passages of the two coolers, means for introducing the separate mediums to be cooled into both of said coolers, a closed refrigerating circuit involving the refrigerating element of the first mentioned cooler, a compressor, a condenser and an expansion valve arranged in series, a by-pass for conveying a portion of the discharged refrigerant from said last mentioned condenser to the refrigerating passage of the secondary cooler, an expansion valve adjacent to said refrigerating passage, and an exhaust conduit leading from said last mentioned refrigerating passage to said second mentioned condenser and a compressor inserted in said exhaust conduit, the cooling passages of both of said coolers being provided with separate controllable inlets and outlets.

27. In a two stage refrigerating system employing two different refrigerants, a double evaporator unit with two closed separate refrigerating passages and a free passage for leading a medium to be cooled through said evaporator unit, two compressors, two condensers, and two expansion valves connected with the double evaporator unit in a prearranged manner to provide two closed refrigerating circuits which may be singly or jointly operated.

28. In a condensing and cooling system of the character described, for low temperature work, a primary condenser, a primary cooler, and a secondary cooler, a closed refrigerating circuit, for cooling the primary cooler, consisting of a compressor, a condenser, an expansion valve and a primary refrigerating element, a second closed refrigerating circuit for cooling said secondary cooler, consisting of a compressor, said last mentioned condenser, an expansion valve, and a secondary refrigerating element, a controllable discharge from the secondary cooler, said primary cooler and said primary refrigerating element being arranged in heat exchange relation with each other, and incorporated in a closed housing, said secondary cooler and said secondary refrigerating element being arranged in heat exchange relation with each other and incorporated in a housing, and means for conducting a medium to be condensed and cooled through said primary condenser, said primary cooler, and said secondary cooler.

29. A refrigerating element comprising, in combination a closed circuit, including two condensers, said circuit having a primary path and a secondary path, said primary path including an expansion valve, refrigerating elements and a compressor in series, said secondary path including an expansion valve, refrigerating elements and a compressor in series, and a second closed circuit including said condensers, said second circuit having a second primary path and a second secondary path and selectively available, said second primary path including an expansion valve, a second primary refrigerating element and one of said mentioned compressors in series, said second secondary path including an expansion valve, a second secondary refrigerating element and a compressor in series, the refrigerating elements of the first circuit being incorporated in an evaporator unit, the refrigerating elements of the second circuit being incorporated in another evaporator unit, whereby either one or both of said units with two cooling circuits is available.

30. In a multiple refrigerating system having two condensers, a combined evaporator and liquid cooler unit, a plurality of expansion valves, and a plurality of compressors and an evaporator and a cooling room interconnected to form a plurality of refrigerating circuits, the method of refrigerating which consists of expanding and vaporizing a liquid refrigerant from one of said condensers in the combined evaporator and liquid cooler unit to refrigerate said unit, precool the liquid refrigerant from said other condenser in the combined evaporator and liquid cooler unit and expanding and vaporizing the main part of said precooled liquid refrigerant in said mentioned evaporator, commingle the other part of said precooled liquid with the liquid of said first mentioned condenser before expanding the same in the evaporator and liquid cooler unit to increase the efficiency of said unit, recompress the expanded and vaporized refrigerants and returning the same back to the condensers to liquefy the same again, leading a medium to be cooled through said evaporator to abstract heat therefrom, utilizing the cooled medium to cool said cooling room, passing the medium from said cooling room first through said mentioned evaporator and cooler unit to abstract heat from said medium and then returning the same to the evaporator to further cool said medium.

31. In a multiple refrigerating system for low temperature and quick freezing work having a condenser, a triple passage cooler unit, a conduit connecting said condenser and said unit, a closed refrigerating circuit consisting of a compressor, a condenser, an expansion valve and one of said passages of said cooler unit to expand a refrigerant therein to refrigerate said cooler unit, a double evaporator, a liquid refrigerant discharge conduit connecting said cooler unit and said double evaporator, a second discharge conduit connecting said first mentioned condenser and said first mentioned discharge conduit in order to mingle the liquid refrigerant from said discharge conduits before entering said double evaporator, two exhaust discharge conduits connecting the evaporator with the first mentioned condenser, and compressor means inserted in said last mentioned exhaust discharge conduits, a cooling room, pipe lines connecting said triple passage unit, said double evaporator and said cooling room, and means for circulating the cooling medium in a closed cycle through said cooling room, said triple passage cooler unit and said double evaporator.

32. In a multiple refrigerating system for low temperature and quick freezing work having a condenser, a triple passage cooler unit, a conduit connecting said condenser and said unit, a closed refrigerating circuit consisting of a compressor, a condenser, an expansion valve and one of said passages of said triple passage cooler unit to expand a refrigerant therein, to refrigerate said cooler unit; a double evaporator, a liquid refrigerant discharge conduit connecting said cooler unit and said double evaporator, a second discharge conduit connecting said first mentioned condenser and said first mentioned discharge conduit in order to mingle the liquid refrigerant from said discharge conduit before entering said double evaporator, two exhaust discharge conduits connecting the evaporator with the first mentioned condenser, compressor means inserted in said last mentioned discharge conduits, pipe, lines connecting said triple passage cooler unit and said double evaporator, and means for leading a medium to be cooled through said cooler unit and said double evaporator.

33. In a multiple refrigerating system, the combination of a compressor, a condenser, a liquid cooler, a double evaporator unit, expansion means for said unit, pipe lines connecting said elements in the order named, connections between the double evaporator, means whereby the refrigerant vapor from its first path through said double evaporator is directed through the second path in said double evaporator and said exhaust thence directed through said liquid cooler and drawn from said liquid cooler by said compressor and thence returned to said condenser.

34. A process of refrigeration which consists in expanding a liquid refrigerant in one path of a double evaporator unit, leading the exhaust with a drop in pressure through the second path of said double evaporator unit, expanding the exhaust from the second path with an additional drop in pressure into a liquid cooler to precool the initially incoming refrigerant, recompressing the gaseous refrigerant and reliquefying the same.

35. A multiple quick acting refrigerating system, comprising a condenser; a combined gas and liquid cooler having separate paths, a double evaporator unit, a compressor, an expansion valve at the inlet of one of the refrigerating elements of said double evaporator unit, controllable pipe lines between the liquid discharge end of the combined gas and liquid cooler and the inlet of one of the refrigerating elements of said double evaporator unit, connections between the discharge end of the first mentioned element of the double evaporator unit and the second element of said unit, a by-pass between the discharge end of said second element and the inlet of the second path in said combined gas and liquid cooler, in combination with a closed circuit involving said first mentioned compressor, a second condenser, an expansion valve and the second mentioned path in the combined gas and liquid cooler whereby the exhaust from the evaporator and vaporized liquid refrigerant from said last mentioned second condenser is utilized in said combined gas and liquid cooler, and means whereby the exhaust from the combined gas and liquid cooler is returned to the first mentioned condenser and to said second mentioned condenser.

36. In a multiple quick acting refrigerating system, the process of refrigerating which consists in expanding a condensed liquid refrigerant in a cooler having a multiple of paths, compressing and condensing a second refrigerant, cooling the second refrigerant in one of the paths in said cooler to a low temperature, expanding the low temperature liquid refrigerant in an evaporator, commingling and expanding a part of the second low temperature liquid refrigerant with the first mentioned liquid refrigerant to increase the efficiency in the first path and recompressing the expanded refrigerants and recondensing the same, leading a medium in contact with the second refrigerant path, utilizing the cooled medium for outside use and then passing said medium through another path in said cooler to precool the medium and then returning the same into contact with the second mentioned low temperature refrigerant path to further cool said medium.

37. In a refrigerating system of the character described, a primary condenser, a secondary condenser and an evaporator, arranged in a closed circuit, means intermediate of the primary condenser and the secondary condenser whereby a portion of the refrigerant issuing from the primary condenser may be conveyed to the inlet of the evaporator and commingled with the portion of refrigerant issuing from the secondary condenser before expansion, a third condenser forming a part of a closed refrigerating circuit, said last mentioned circuit being adapted to abstract heat from the first mentioned circuit, and means whereby the refrigerants are caused to circulate through said circuits.

38. In a condensing and cooling system of the character described having a water cooled condenser, a primary cooler, a secondary cooler, connected in the order named, a second condenser, liquid refrigerant discharge conduits connecting said primary cooler and said secondary cooler, liquid refrigerant expansion means for both of said coolers to control the pressure or vacuum and the temperature in said coolers, conduits and compressor means arranged to draw off the vaporized refrigerants and to return them to the second mentioned condenser; and means for leading a fluid medium to be condensed or cooled, through said first mentioned condenser, said primary cooler and said secondary cooler.

39. In a refrigerating system a condenser, a combined gas and liquid cooler unit having a refrigerant evaporating element, a conduit connecting said condenser and said unit, means for introducing a refrigerant gas under pressure into said condenser to condense the same, separate means for introducing a refrigerant gas of temperature lower than said aforementioned gas into said unit, said liquid cooling element in said unit being adapted to cool the liquid from said condenser and said gas at the same pressure, and means for withdrawing liquid refrigerant from said unit.

40. In a refrigerating system, comprising compressor means; a condenser; a liquid cooler; a refrigerator or evaporator, connected in the order named; valve controlled exhaust discharge conduits arrangements whereby the exhaust from said refrigerator or evaporator may be drawn off through said liquid cooler in part or in full by the compressor means, or the exhaust from the refrigerator or evaporator may be drawn off in part or in full directly by the compressor means.

41. In a refrigerating system, a condenser, a combined gas and liquid cooler unit provided with a refrigerating element connected with said condenser; an expansion valve for said refrigerating element; arrangements whereby liquid refrigerant from said condenser may be supplied to said refrigerating element; means for withdrawing the vaporized refrigerant from said element and to return the same to the condenser; a second condenser connected with said unit; means whereby compressed gas is introduced into the second mentioned condenser to be liquefied; means for introducing compressed gas into said unit, whereby said gas and the liquid from said second mentioned condenser are mingled and further condensed and cooled at constant pressure in said unit; and a liquid discharge conduit for said unit.

AUGUST SCHWARZ.